United States Patent [19]
Corley

[11] Patent Number: 4,628,080
[45] Date of Patent: Dec. 9, 1986

[54] CURE RATE CONTROL IN EPOXY RESIN COMPOSITIONS

[75] Inventor: Larry S. Corley, Houston, Tex.

[73] Assignee: Shell Oil Company, Houston, Tex.

[21] Appl. No.: 782,749

[22] Filed: Sep. 30, 1985

[51] Int. Cl.$^4$ .................... C08G 59/68; C08G 59/72
[52] U.S. Cl. ..................................... 528/88; 523/456;
528/89; 528/90; 528/91; 528/92; 528/408;
528/409; 528/413; 528/416
[58] Field of Search ............... 528/89, 91, 90, 92,
528/88, 408, 416, 409, 413; 523/456

[56] References Cited

U.S. PATENT DOCUMENTS 4,224,422  9/1980  Rode et al. .
4,412,048 10/1983  Dixon et al. ...................... 525/524
4,456,713  6/1984  French et al. ..................... 523/455

FOREIGN PATENT DOCUMENTS 976680    3/1971  Canada .
47-33200  3/1971  Japan .
48-55296 11/1971  Japan .
48-102157 4/1972  Japan .
54-127958 3/1978  Japan .
56-149420 4/1980  Japan .
57-180625 4/1981  Japan .
58-215417 6/1982  Japan .
59043016  9/1982  Japan .
720004    4/1978  U.S.S.R. .

Primary Examiner—Earl Nielsen

[57] ABSTRACT

A composition is provided comprising an epoxy resin, a cationic curing agent for the epoxy resin and a surfactant. The surfactant improves the reproducibility of cure rates of the cationic curing agent, particularly when the cationic curing agent is used in the form of an aqueous solution.

12 Claims, No Drawings

CURE RATE CONTROL IN EPOXY RESIN COMPOSITIONS

BACKGROUND OF THE INVENTION

This invention relates to epoxy resin compositions. In one aspect, the invention relates to the curing of epoxy resin compositions.

Cationic curing agents for epoxy resins, such as Lewis acids ($BF_3$ and $SnCl_4$, for example) and their complexes, protonic acids containing anions of low nucleophilicity ($HBF_4$, $HPF_6$, $HSbF_6$, $CF_3SO_3H$ and $H_2SO_4$, for example) and certain salts of these acids have a number of useful properties. Many of these curing agents will cure liquid epoxy resins to hard solids without application of external heat within seconds or minutes after the resin and curing agent are mixed at room temperature.

Many of the most rapid curing agents for epoxy resins, such as $HBF_4$, $HPF_6$ and a number of tetrafluoroborate salts, are available commercially only as aqueous solutions. These aqueous solutions are not soluble in bisphenol-A based epoxy resins and form suspensions of small globules when mixed with the resins. Cure of the resins is dependent on the diffusion of the cationic initiator from the globules of aqueous solution into the bulk of resin phase. The rate of cure of the resin will therefore be strongly dependent on the size and degree of dispersion of the globules of aqueous curing agent solution and hence on mixing intensity. In some cases, rapid cure can occur at the interface around a particle of aqueous curing agent solution, which retards or prevents diffusion of the curing agent into the bulk of the resin and results in delayed or incomplete cure.

One approach to the problem would be using organic solutions of the cationic curing agents rather than aqueous solutions. This generally improves mixing for those curing agents which are soluble in organic solvents. Some cationic curing agents, however, are not very soluble in organic solvents. Others, such as $HBF_4$, are unstable in some organic solvents, tending to revert to gaseous HF and $BF_3$. Even for soluble curing agents, however, the evaporation of water from an aqueous cationic curing agent solution and its replacement with an organic solvent requires considerable energy expenditure and inconvenience.

It would therefore be desirable to provide a method for improving the cure reproducibility of epoxy resin systems containing aqueous cationic curing agents. It is therefore an object of the present invention to provide novel epoxy resin compositions containing cationic curing agents. It is a further object to improve the cure rate reproducibility of epoxy resin systems containing aqueous solutions of cationic curing agents.

SUMMARY OF THE INVENTION

According to the invention, the cure rate reproducibility of epoxy resin compositions containing cationic curing agents is improved by carrying out the curing reaction in the presence of a surfactant.

DETAILED DESCRIPTION OF THE INVENTION

The epoxy resin component of the invention compositions can be any curable epoxy resin having, on the average, more than two vicinal epoxide group per molecule. The epoxy resin can be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing at least one hydroxyl group carried out under alkaline reaction conditions. The epoxy resin products obtained when the hydroxyl group containing compound is bisphenol-A are represented below by structure I wherein n is zero or a number greater than 0, commonly in the range of 0 to 10, preferably in the range of 0 to 2.

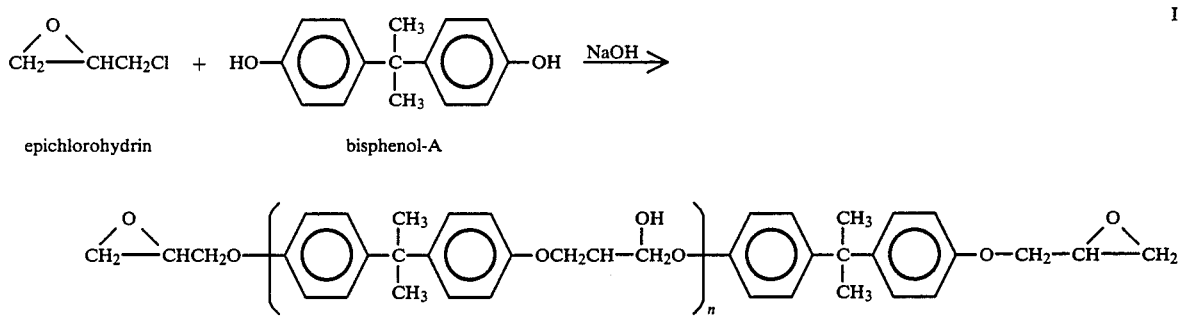

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 50 to about 10,000, preferably about 200 to about 1500. The commercially available epoxy resin EPON ® 828, a reaction product of epichlorohydrin and 2,2bis(4-hydroxylphenyl)propane (bisphenol-A) having a molecular weight of about 400, an epoxide equivalent (ASTM D-1652) of about 185-192, and an n value in formula I above of about 0.2, is presently the preferred epoxy resin because of its wide applicability and commercial availability.

The epoxy resin will be used in combination with a curing agent. Many varieties of curing agents for epoxy resins are known in the art, including amines, acids and anhydrides. The invention method of retarding the cure of an epoxy resin composition containing a curing agent is particularly suitable for use with cationic curing agents. As is known in the art, "cationic curing agents"

include Lewis acids and their complexes, protonic acids containing anions of low nucleophilicity and salts of such protonic acids. Specific examples of such cationic curing agents include, for example, $BF_3$, $SnCl_4$, $HBF_4$, $HPF_6$, $HSbF_6$, $CF_3SO_3H$, $H_2SO_4$, $BF_3 \cdot (C_2H_5)_2O$, and certain metal tetrafluoroborates such as $Sn(BF_4)_2$ and $Al(BF_4)_3$. Such curing agents will generally cure liquid epoxy resins at room temperature to hard solids within a few seconds or minutes after epoxy resin and curing agent are mixed.

The curing agent will be added to an epoxy resin in an amount which will effect curing of the resin to a solid under suitable curing conditions, which may include the application of heat to the epoxy resin. The curing agent will generally be present in an amount of about 0.01 to about 10 weight percent, based upon the weight of the epoxy resin, preferably about 0.5 to about 5 weight percent.

The invention composition contains a surfactant in an amount effective to promote dispersion of the components of the composition, particularly the curing agent in the epoxy resin. The surfactant is preferably a nonionic surfactant present in the composition in an amount within the range of about 0.01 to about 10 weight percent, based on the weight of the epoxy resin, preferably about 0.5 to about 5 weight percent. Examples of suitable surfactants include linear or branched alcohol ethoxylates, linear or branched alkylphenol ethoxylates and ethyleneoxide-propylene oxide block copolymers. Suitable nonionic surfactants can be represented by the formula $R-O-(CH_2CH_2O)_nH$, in which n is 2 to 20 and R is $C_6$ to $C_{30}$ alkyl, cycloalkyl, alkaryl or aralkyl. The surfactant as described in the formula can have various substituents including halogens, alkoxy groups, hydroxyl groups, and the like.

The invention composition can optionally contain additives for control of the curing rate, such as accelerators or retardants of the cure reaction. The invention method of improving the reproducibility of cure times with cationic curing agents can be employed with compositions containing such optional additives.

The epoxy resin, cationic curing agent and surfactant can be combined as a mixture of the epoxy resin and surfactant with the curing agent or as a mixture of the curing agent and surfactant with the epoxy resin. Mixing is preferably carried out by combining, with vigorous stirring, the epoxy resin with an aqueous solution of the curing agent and surfactant.

The invention compositions are useful generally in typical epoxy resin applications such as coatings, structural composites and particularly adhesives.

EXAMPLE

Twelve 100 ml polypropylene beakers were each filled with 25 grams of a mixture of 100 parts of EPON ® Resin 828 and 4 parts of Naugalube ® 438-L. (Naugalube 438-L is a mixture of alkylated diphenylamines sold by Uniroyal. It is added to the resin to control the rate of gelation.) To the first group of 6 beakers was added 0.67 g of 48% aqueous tetrafluoroboric acid. To the second group of 6 beakers was added a mixture of 0.67 g of 48% aqueous tetrafluoroboric acid and 0.33 g of NEODOL ® 91-6. The mixtures of resin and curing agent were hand stirred rapidly with wooden tongue depressors and time to gelation was determined. Results are given in the table below.

| Curing Agent | Time to Gelation (Seconds) | Mean | Standard Deviation |
| --- | --- | --- | --- |
| 48% Aq. $HBF_4$ | 250, 146, 150, 65, 42, 280 | 155.5 | 95.5 (61.4% of Mean) |
| 48% Aq. $HBF_4$ + NEODOL 91-6 | 34, 31, 35, 37, 46, 30 | 35.5 | 5.75 (16.2% of Mean) |

The above table shows that the NEODOL 91-6 decreases the mean time to gelation by approximately a factor of five and also greatly improves reproducibility.

I claim:
1. A composition comprising:
   (a) an epoxy resin;
   (b) a cationic curing agent for the epoxy resin; and
   (c) from about 0.01 to about 10 weight percent, based on the weight of the epoxy resin, of a surfactant.
2. The composition of claim 1 in which the cationic curing agent is selected from the group consisting of Lewis acids, complexes of Lewis acids, protonic acids having anions of low nucleophilicity, and metal salts of said protonic acids.
3. The composition of claim 2 in which the cationic curing agent is selected from the group consisting of $BF_3$, $SnCl_4$, $HBF_4$, $HPF_6$, $HSbF_6$, $CF_3SO_3H$, $H_2SO_4$, $Sn(BF_4)_2$, $Al(BF_4)_3$ and $Mg(BF_4)_2$.
4. The composition of claim 1 in which the surfactant is a nonionic surfactant.
5. The composition of claim 3 in which the surfactant is selected from the group consisting of linear and branched alcohol ethoxylates, linear and branched alkylphenol ethoxylates, and ethylene oxide-propylene oxide block copolymers.
6. The composition of claim 5 in which the surfactant is present in an amount of from about 0.5 to about 5 weight percent, based on the weight of the epoxy resin.
7. The composition of claim 2 in which the cationic curing agent is present in the form of an aqueous solution.
8. A method for controlling the cure rate of an epoxy resin composition comprising an epoxy resin and a cationic curing agent, the method comprising incorporating in the epoxy resin composition from about 0.01 to about 10 weight percent of a surfactant, based on the weight of the epoxy resin.
9. The method of claim 8 in which the cationic curing agent is an aqueous solution of a compound selected from the group consisting of $BF_3$, $SnCl_4$, $HBF_4$, $HPF_6$, $HSbF_6$, $CF_3SO_3H$, $H_2SO_4$, $Sn(BF_4)_2$, $Al(BF_4)_2$ and $Mg(BF_4)_2$.
10. The method of claim 9 in which the surfactant is a nonionic surfactant.
11. The method of claim 9 in which the surfactant is selected from the group consisting of linear and branched alcohol ethoxylates, linear and branched alkylphenol ethoxylates, and ethylene oxide-propylene oxide block copolymers.
12. The method of claim 11 in which the surfactant is present in an amount of about 0.5 to about 5 weight percent, based on the weight of the epoxy resin.

* * * * *